US007997658B2

(12) United States Patent
DeLellis et al.

(10) Patent No.: US 7,997,658 B2
(45) Date of Patent: Aug. 16, 2011

(54) FOUR POINT SEAT RESTRAINT SYSTEM

(75) Inventors: Louis D DeLellis, South Lyon, MI (US);
John E Schambre, Canton, MI (US);
Michael O Forker, Novi, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 306 days.

(21) Appl. No.: 11/156,407

(22) Filed: Jun. 20, 2005

(65) Prior Publication Data
US 2006/0290192 A1 Dec. 28, 2006

(51) Int. Cl.
*B60R 22/00* (2006.01)
*B60R 22/10* (2006.01)

(52) U.S. Cl. .................... 297/484; 297/254; 297/485

(58) Field of Classification Search ............ 297/465, 297/469, 483, 484, 485, 486, 254; 280/801.1, 280/803, 808
See application file for complete search history.

(56) References Cited

U.S. PATENT DOCUMENTS

| | | | | |
|---|---|---|---|---|
| 1,368,466 A * | 2/1921 | Tyler | | 297/484 |
| 2,825,581 A * | 3/1958 | Knight | | 280/806 |
| 2,833,555 A * | 5/1958 | Zotkewicz | | 297/484 |
| 2,856,991 A | 10/1958 | Princiotta | | |
| 2,876,829 A * | 3/1959 | Johnson | | 297/486 |
| 2,886,259 A * | 5/1959 | Barecki | | 242/383 |
| 2,898,976 A * | 8/1959 | Barecki | | 280/806 |
| 3,321,247 A | 5/1967 | Dillender | | |
| 3,954,280 A * | 5/1976 | Roberts et al. | | 280/801.2 |
| 3,971,569 A * | 7/1976 | Abe et al. | | 280/733 |
| 4,099,778 A * | 7/1978 | Lehr | | 297/472 |
| 4,226,474 A * | 10/1980 | Rupert et al. | | 297/484 |
| 4,396,228 A * | 8/1983 | Go | | 297/484 |
| 4,674,800 A * | 6/1987 | Ensign | | 297/465 |
| 5,076,598 A | 12/1991 | Nauman | | |
| 5,299,855 A * | 4/1994 | Zubeck | | 297/485 |
| 5,733,014 A | 3/1998 | Murray | | |
| 5,918,934 A * | 7/1999 | Siegrist | | 297/250.1 |
| 6,009,839 A * | 1/2000 | Kohn | | 119/770 |
| 6,402,251 B1 * | 6/2002 | Stoll | | 297/485 |
| 6,547,334 B1 * | 4/2003 | Girardin | | 297/484 |
| 6,857,430 B2 * | 2/2005 | Morris | | 128/869 |
| 2003/0173817 A1 * | 9/2003 | Vits et al. | | 297/484 |

FOREIGN PATENT DOCUMENTS

JP 401115755 A * 5/1989

* cited by examiner

*Primary Examiner* — Anthony D Barfield
(74) *Attorney, Agent, or Firm* — Ralph E. Smith

(57) ABSTRACT

A restraint system is disclosed for securing a passenger to a seat in a motor vehicle. The restraint system is composed of a four point restraint belt removably attached to a vehicle seat having a plurality of vertical straps and attachment mechanisms for connecting said straps across the passenger's chest and lap. Each of the vertical straps has a first end removably attached to latches located in the front of the seat back and a second end removably attached to a latch located behind the vehicle seat.

10 Claims, 1 Drawing Sheet

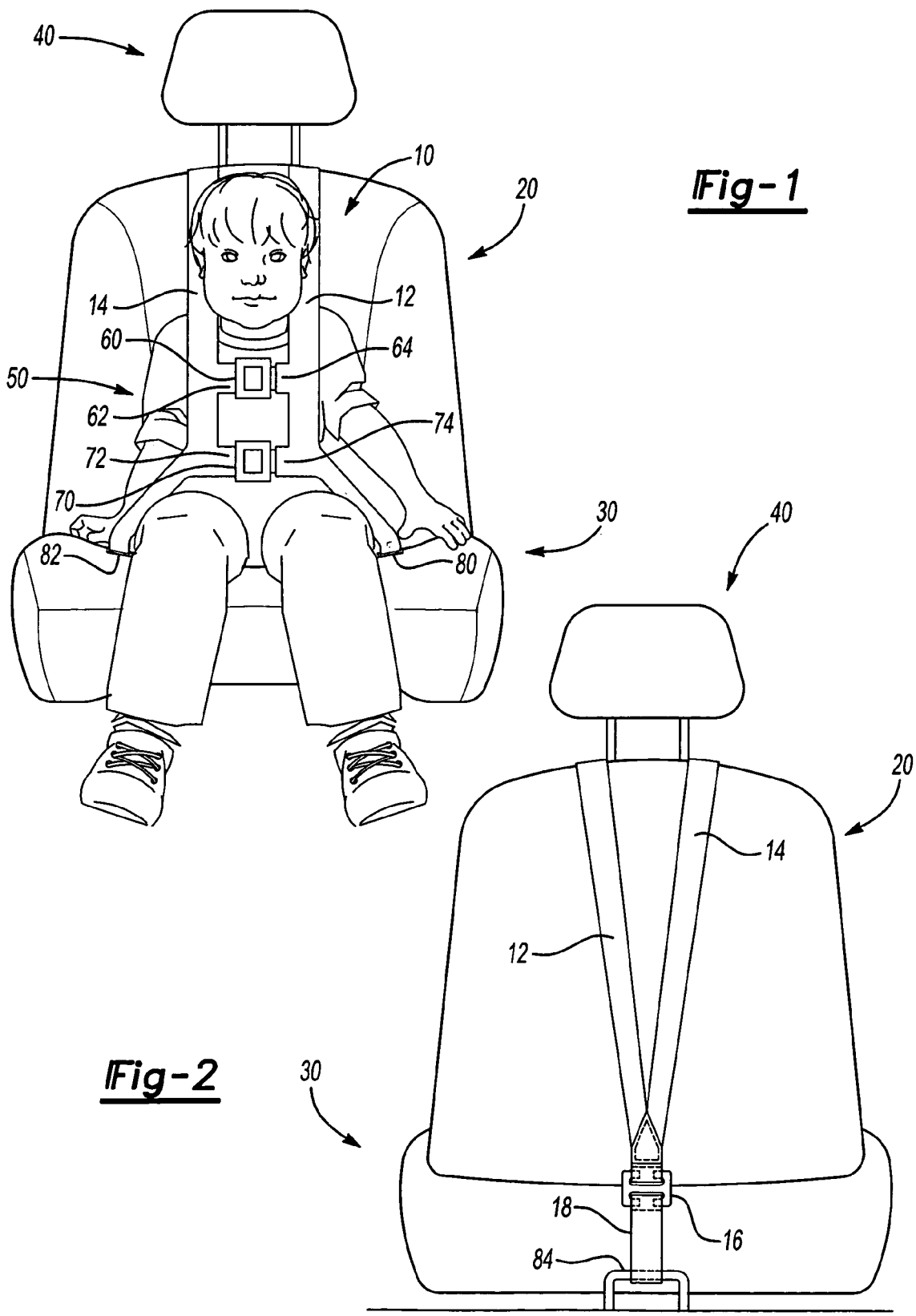

FOUR POINT SEAT RESTRAINT SYSTEM

FIELD OF THE INVENTION

The present invention relates to child safety restraint devices, and more particularly, to an adjustable restraint system for securing a child weighing more than sixty pounds to a vehicle seat.

BACKGROUND OF THE INVENTION

Federal vehicle seat minimum performance standards have been established to ensure a reasonable degree of safety for a seat occupant. In the case where vehicle seats are intended for children, these performance standards require providing a child with a seat restraint compatible with the child's size. Among other requirements, when the child is secured in the seat, the restraints should not pass over the face, neck or throat of the child. As a result, child restraint systems are typically provided in many sizes and configurations.

A wide variety of potential child restraint systems are well known in the art and include both conventional forward (or rearward) facing car seats and booster seats which utilize the vehicle supplied shoulder and lap belt for restraining the child in the seat. Each of these potential child restraint systems possess known drawbacks resulting from the rapid growth and development of children. Conventional car seats tend to be "grown out of" in relatively short periods of time, requiring adjustment or replacement at various stages of the physical development of the child. Conventional car seats also are typically only intended to safely and comfortably secure a child weighing up to sixty pounds. Booster seats which utilize the vehicle supplied shoulder and lap belt for restraining the child in the seat can be difficult to position and adjust to provide a larger child with maximum benefit from the restraint system. Both conventional car seats and child booster seats are also bulky and create storage and space availability issues when not in use within a vehicle.

It is therefore desirable to provide a child restraint system that is easily adjustable, compact and capable of accommodating and providing child weighing over sixty pounds with the maximum benefit from the restraint system.

SUMMARY OF THE INVENTION

Accordingly, one aspect of the present invention provides a restraint system for securing a child in a motor vehicle capable of accommodating and providing a child weighing over sixty pounds with the maximum benefit of a seat restraint system.

Another aspect of the present invention is to provide a restraint system having a high degree of adjustability for accommodating a range of seat occupants using a minimal number of independently adjustable parts.

In accordance with the foregoing aspects of the invention, a seat restraint system is shown that includes a restraint belt removably attached to a vehicle seat having a plurality of vertical straps and attachment mechanisms for connecting said straps across the passenger's chest and lap. Each of the vertical straps has a first end removably attached to latches located in the front of the seat back and a second end removably attached to a latch located behind the vehicle seat.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a front view of a seat restraint system according to an exemplary embodiment of the present invention; and FIG. 2 is a rear view of a seat restraint system according to an exemplary embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

Referring now to the drawings, an exemplary embodiment of the present invention is described hereinafter according to FIGS. 1 and 2. As shown in FIG. 1, a seat restraint system 10 according to the present invention is shown that is used for securing a passenger 50 to a seat 30. The vehicle seat 30 has a seat back 20 that extends vertically upward from the horizontally positioned seat as is well known in the art. A headrest 40 may also be attached to the top of the seat back 20.

FIG. 1 shows a passenger 50 in a sitting position on the seat 30. The passenger is secured to the seat 30 by the restraint system 10. The restraint system 10 consists of a two shoulder straps 12 and 14. The shoulder straps 12 and 14 are first secured to the vehicle by forward latch mechanisms 80 and 82 located between the seat 30 and seat back 20. In an exemplary embodiment of the present invention, the forward latch mechanisms are vehicle supplied anchor points provided at the junction of the seat and seat back, also known as iso-fix restraints. The shoulder straps 12 and 14 extend vertically upward over the passenger's shoulder and are looped over the top of the seat back 20 and headrest 40.

The restraint system 10 has a chest belt and lap belt attached to the shoulder straps 12 and 14. The chest belt interconnects the shoulder straps 12 and 14 at a front location overlying the chest of the passenger 50 with the chest belt having two component parts 62 and 64, one attached to each of the shoulder straps by any suitable method, such as sewing. The two component parts each have a component of a quick-release, conventional seat belt buckle fastener 60, with a male portion, mating female portion, release mechanism and length adjustable slide mechanism as is well-known in the art. The lap belt likewise interconnects the shoulder straps 12 and 14 at a front location overlying the lap of the passenger 50 with the lap belt having two component parts 72 and 74, one attached to each of the shoulder straps by any suitable method, such as sewing. The two component parts each have a component of a quick-release, conventional seat belt buckle fastener 70, with a male portion, mating female portion, release mechanism and length adjustable slide mechanism as is well-known in the art. It is understood that while the exemplary embodiment of the present invention details horizontal chest and lap belts, the present invention also encompasses the use of a simple tongue and buckle arrangement located at chest and lap belt level for connecting the shoulder straps 12 and 14.

FIG. 2 shows a rear view of the restraint system 10 attached to the vehicle seat 30. The shoulder straps 12 and 14, which are looped over the seat back 20 on either side of the head rest 40, are then secured to the vehicle behind the seat back 20 by means of a rear latch mechanism 84 located behind the seat. In an exemplary embodiment of the present invention, shoulder straps 12 and 14 are joined together prior to attaching to the rear latch mechanism 84. After the shoulder straps 12 and 14 are joined to each other, the straps connect to a length adjustable fastener 16. As shown in FIG. 2, the fastener 16 is a simple buckle connected to a connector strap 18 having a loop fed through the fastener 16 to allow the length of the connector strap 18 to be adjusted to a variety of lengths. The connector strap 18 is then connected to the rear latch mechanism 84. The rear latch mechanism 84 consists of tether anchor hooks which may be located on the rear window ledge of the vehicle, the back of the vehicle seat, or on the floor of the vehicle as is well known in the art. A rear latch mechanism 84 centered relative to the vehicle seat is desirable as a direct restraint minimizing the ability of the restraint system to move out of position and enabling the passenger 50 to be positioned in an unfavorable load path relative to the restraint system 10.

After attachment of the restraint system 10 to the vehicle as described above, the passenger 50 may then be secured in the vehicle through use of the chest belt 62, 64 and buckle 60 and lap belt 72, 74 and buckle 70. The passenger is then secured to the vehicle seat 30 in a safe and comfortable seating position. The advantage of the present invention over prior restraint systems is that it is easily adjustable to accommodate a wide variety of sizes of children weighing sixty pounds who are too large for conventional car seats but too small to use vehicle provided safety restraints. Another advantage of the present invention is that the restraint system of the present invention is easily removable and compact for storage purposes when not in use.

It is noted that in an exemplary form of the invention, all of the strap components are made of conventional nylon webbing, but those skilled in the art will recognize that other materials may be used to construct the strap components of the present invention. It is further noted that while the exemplary embodiment described herein describes the use of a length adjustable fastener 16 and connector strap 18, those skilled in the art will recognize that the shoulder straps 12 and 14 may be connected directly to the rear latch mechanism 84. Those skilled in the art will further recognize that length adjustment mechanisms may be added to each shoulder strap 12 and 14 as an alternate means of permitting the adjustment of the restraint system 10 to fit a variety of passenger sizes.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A four-point restraint system in a motor vehicle having a vehicle seat with a seat back, the restraint system comprising:
a plurality of shoulder straps removably attachable at a first end to a plurality of vehicle-supplied iso-fix restraints at a junction of the vehicle seat and seat back, vertically extendible over the passenger's shoulders and around the seat back, and joined at a second end behind the seat back;
a length-adjustable connector strap connected to the joined shoulder straps and connectable to a single vehicle anchor located either on a bottom portion of the vehicle seat behind the seat back or a floor of the vehicle and centered relative to the vehicle seat; and
chest and lap belts affixed to and interconnecting the shoulder straps, the chest and lap belts each including a seat belt buckle,
wherein each one of the plurality of shoulder straps extend into the junction of the seat and the seat back where each shoulder strap is attachable to a corresponding one of the iso-fix, restraints and wherein the lap belt interconnects the shoulder straps above the junction and a distance above the seat.

2. The four-point restraint system of claim 1, wherein each one of the plurality of shoulder straps has a fixed length.

3. The four-point restraint system of claim 2, wherein each one of the plurality of shoulder straps has a portion that extends downwardly along part of a backside of the seat back adjacent where the shoulder straps are joined behind the seat back.

4. The four-point restraint system of claim 3, wherein part of the connector strap extends downwardly behind a backside of the seat.

5. A restraint system for securing a passenger seated in a vehicle, the restraint system comprising:
a pair of shoulder straps, each shoulder strap having a first end adapted to be removably attached to a respective one of lower anchors disposed between a seat cushion and seat back of a vehicle seat, a second end, and a fixed length intermediate the first and second ends adapted to overlie a chest and respective shoulder of the passenger, the fixed length being further adapted to overlie a top of the seat back;
a connector strap having a first end attached to the second end of each shoulder strap, and a second end adapted to be removably attached to a tether anchor affixed to either a bottom portion of the vehicle seat or a floor of the vehicle, the connector strap having an adjustable length;
a first bridging strap affixed to the first and second shoulder straps including a first seat belt buckle for detachably connecting the first shoulder strap to the second shoulder strap, the first bridging strap being adapted to overlie only the chest of the passenger, the first bridging strap being attached to a first of the pair of milder straps at a first attachment point disposed a first fixed distance from the respective lower anchors when the first end of the first shoulder strap is removably attached to the respective one of the lower anchors; and
a second bridging strap affixed to the first and second shoulder straps including a second seat belt buckle for detachably connecting the first shoulder strap to the second shoulder strap, the second bridging strap being adapted to overlie only a lap of the passenger.

6. The restraint system of claim 5, wherein the second bridging strap is attached to the first shoulder strap at a second attachment point disposed a second fixed distance from the respective one of the lower anchors when the first end of the first shoulder strap is removably attached to the respective one of the lower anchors.

7. The restraint system of claim 5, wherein each one of the plurality of shoulder straps extend into the junction of the seat and the seat back where each shoulder strap is attachable to a corresponding one of the lower anchors and wherein the lap belt interconnects the shoulder straps above the junction and a distance above the seat.

8. The restraint system of claim 5, wherein the length of each one of the plurality of shoulder straps is fixed.

9. The restraint system of claim 5, wherein the second end and at least part of the fixed length of the pair of shoulder straps each extend downwardly along a backside of the seat back and below a top portion of the seat back.

10. The restraint system of claim 5, wherein part of the connector strap extends downwardly behind a backside of the seat.

* * * * *